US010136217B2

(12) United States Patent
Sun

(10) Patent No.: US 10,136,217 B2
(45) **Date of Patent: *Nov. 20, 2018**

(54) SOUNDFIELD DECOMPOSITION, REVERBERATION REDUCTION, AND AUDIO MIXING OF SUB-SOUNDFIELDS AT A VIDEO CONFERENCE ENDPOINT

(71) Applicant: Cisco Technology, Inc., San Jose, CA (US)

(72) Inventor: Haohai Sun, Nesbru (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/785,545

(22) Filed: Oct. 17, 2017

(65) Prior Publication Data

US 2018/0041835 A1 Feb. 8, 2018

Related U.S. Application Data

(63) Continuation of application No. 15/170,495, filed on Jun. 1, 2016, now Pat. No. 9,813,811.

(51) Int. Cl.

| | |
|---|---|
| ***H04B 3/20*** | (2006.01) |
| ***H04R 3/00*** | (2006.01) |
| ***H04R 29/00*** | (2006.01) |

(52) U.S. Cl.

CPC ........... *H04R 3/005* (2013.01); *H04R 29/005* (2013.01); *H04R 2410/01* (2013.01); *H04R 2430/20* (2013.01)

(58) Field of Classification Search

CPC .. H04R 3/005; H04R 29/004; H04R 2430/20; H04R 2410/01; G06F 3/165

USPC ........... 381/26, 56, 61, 66, 71.11, 71.12, 92, 381/94.1, 94.2, 94.3, 119, 120, 122

See application file for complete search history.

(56) References Cited

U.S. PATENT DOCUMENTS 9,232,309 B2 1/2016 Zheng et al.
9,288,576 B2 3/2016 Togami et al.

(Continued)

FOREIGN PATENT DOCUMENTS

WO 2015/013058 A1 1/2015
WO 2016/004225 A1 1/2016

OTHER PUBLICATIONS

"Microphone Array", Microsoft Research, http://research.microsoft.com/en-us/projects/microphone_array/, downloaded from the internet on Mar. 29, 2016, 4 pages.

(Continued)

*Primary Examiner* — Vivian Chin
*Assistant Examiner* — Friedrich W Fahnert
(74) *Attorney, Agent, or Firm* — Edell, Shaprio & Finnan, LLC

(57) ABSTRACT

At a microphone array, a soundfield is detected to produce a set of microphone signals each from a corresponding microphone in the microphone array. The set of microphone signals represents the soundfield. The detected soundfield is decomposed into a set of sub-soundfield signals based on the set of microphone signals. Each sub-soundfield signal is processed, such that each sub-soundfield signal is separately dereverberated using other ones of the sub-soundfield signals to remove reverberation from the sub-soundfield signal, to produce a set of processed sub-soundfield signals. The set of processed sub-sound field signals are mixed into a mixed output signal.

20 Claims, 7 Drawing Sheets

(56) References Cited

U.S. PATENT DOCUMENTS

| | | | |
|---|---|---|---|
| 2011/0158418 | A1 | 6/2011 | Bai et al. |
| 2014/0241528 | A1 | 8/2014 | Gunawan et al. |

OTHER PUBLICATIONS

S. Yan et al., "Optimal Modal Beamforming for Spherical Microphone Arrays", IEEE Tranasactions on Audio, Speech, and Language Processing, vol. 19, No. 2, Feb. 2011, 11 pages.
H. Sun et al., "Optimal Higher Order Ambisonics Encoding With Predefined Constraints", IEEE Transactions on Audio, Speech, and Language Processing, vol. 20, No. 3, Mar. 2012, 13 pages.
Shefeng Yan, "Broadband Beamspace DOA Estimation: Frequency-Domain and Time-Domain Processing Approaches", Hindawi Publishing Corporation, EURASIP Journal on Advances in Signal Processing, vol. 2007, Article ID 16907, doi:10.1155/2007/16907, Sep. 2006, 10 pages.
Joseph T. Khalife, "Cancellation of Acoustic Reverberation Using Adaptive Filters", Center for Communications and Signal Processing, Department of Electrical and Computer Engineering, North Carolina State University, Dec. 1985, CCSP-TR-85/18, 91 pages.
Marro, et al., "Analysis of Noise Reduction and Dereverberation Techniques Based on Microphone Arrays with Postfiltering," IEEE Transactions on Speech and Audio Processing, vol. 6, No. 3, May 1998, 20 pages.

SOUNDFIELD DECOMPOSITION, REVERBERATION REDUCTION, AND AUDIO MIXING OF SUB-SOUNDFIELDS AT A VIDEO CONFERENCE ENDPOINT

CROSS-REFERENCE TO RELATED APPLICATION

This application is a continuation application of U.S. Non-Provisional application Ser. No. 15/170,495, filed on Jun. 1, 2016, the entirety of which is incorporated herein by reference.

TECHNICAL FIELD

The present disclosure relates to audio processing of soundfields and sub-soundfields.

BACKGROUND

A "near-end" video conference endpoint captures video of and audio from participants in a room during a conference, for example, and then transmits the captured video and audio to "far-end" video conference endpoints. During the conference, reproduced voice conversations should sound natural and clear to the participants, as if the far-end and near-end participants were in the same room. Participants usually occupy random positions in the room, and it is common practice to place/distribute a number of microphones on a table, on walls, and/or in a ceiling of the room. Typically, a conference sound mixer is used to mix microphone channels from the microphones with highest sound levels, a highest signal to noise ratio (SNR), or a highest direct sound to reverberation ratio (DRR), in an attempt to detect participant voices with a good sound quality. Use of such distributed microphones has drawbacks. For example, from an aesthetic perspective, the distributed microphones add room clutter. Also, installing, configuring, and maintaining the distributed microphones (and mixers) can be time consuming and expensive. In addition, the audio signals captured at the spatially distributed microphones may be highly coherent with different and random phase delays such that, when mixed together, the resultant signal may be distorted due to a comb filtering effect.

DESCRIPTION OF EXAMPLE EMBODIMENTS

Overview

At a microphone array in a conference endpoint, a soundfield is detected to produce a set of microphone signals each from a corresponding microphone of the microphone array. The set of microphone signals represent the soundfield. The detected soundfield is decomposed into a set of sub-soundfield signals based on the set of microphone signals. Each sub-soundfield signal is processed, such that each sub-soundfield signal is dereverberated using other ones of the sub-soundfield signals to remove reverberation from the sub-soundfield signal, to produce a set of processed sub-soundfield signals. The set of processed sub-sound field signals are mixed into a mixed output signal.

Example Embodiments

Embodiments presented herein integrate a microphone array into a video conference endpoint as a replacement for a conventional collection of table, wall, and ceiling microphones. While the integrated microphone array simplifies the physical microphone arrangement, a soundfield detected by the microphone array is susceptible to undesired interference, including room noise, reflections, and reverberation, which can result in a distorted, reverberant, and hollow sound quality. Accordingly, at a high-level, the embodiments employ microphone array-based sound field decomposition to decompose the detected soundfield into multiple sub-soundfields, multi-channel dereverberation to separately reduce reverberation of each sub-soundfield, and associated audio mixing of the dereverberated sub-soundfields into a mixed audio signal, respectively. These operations effectively extend an audio pickup range of the microphone array, capture desired speech signals more distinctly, and filter noise, room reflections, and reverberation, with reduced comb-filtering effects. One reason for these improvements is that, after the soundfield decomposition and dereverberation, levels of interference and reverberation in any given sub-soundfield is less than that of the entire detected soundfield and may be reduced on a per sub-soundfield basis, and the known phase/group delays between different sub-soundfields are approximately fixed and may be pre-compensated.

Figure 1:
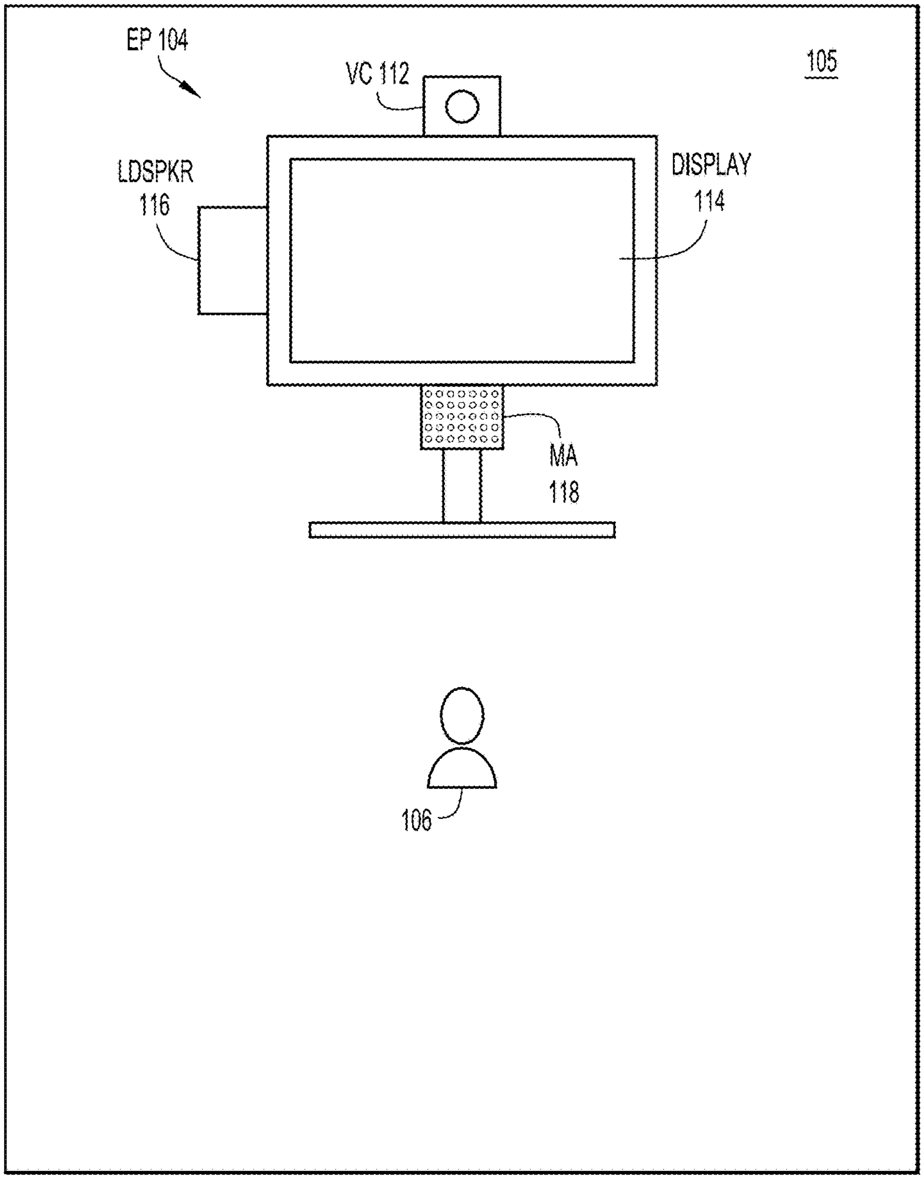
FIG. 1 is an illustration of a video conference (e.g., teleconference) endpoint deployed in a room with a conference participant, according to an example embodiment.

With reference to FIG. 1, there is an illustration of an example video conference (e.g., teleconference) endpoint (EP) 104 (referred to simply as "endpoint" 104), in which embodiments presented herein may be implemented. Endpoint 104 is depicted as being deployed in a conference room 105 (shown simplistically as an outline in FIG. 1) and operated by a local user/participant 106. Endpoint 104 is configured to establish audio-visual teleconference collaboration sessions with other endpoints over a communication network (not shown in FIG. 1), which may include one or more wide area networks (WANs), such as the Internet, and one or more local area networks (LANs).

Endpoint 104 may include a video camera (VC) 112, a video display 114, a loudspeaker (LDSPKR) 116, and a microphone array (MA) 118, which may include a two-dimensional array of microphones as depicted in FIG. 1, or, alternatively, a one-dimensional array of microphones. Endpoint 104 may be a wired and/or a wireless communication device equipped with the aforementioned components, such as, but not limited to laptop and tablet computers, smartphones, etc. In a transmit direction, endpoint 104 captures audio/video from local participant 106 with MA 118/VC 112, encodes the captured audio/video into data packets, and transmits the data packets to other endpoints. In a receive direction, endpoint 104 decodes audio/video from data packets received from other endpoints and presents the audio/video to local participant 106 via loudspeaker 116/display 114.

According to embodiments presented herein, at a high-level, a soundfield in room 105 may include desired sound, such as speech from participant 106. The soundfield may also include undesired sound, such as reverberation, echo, and other audio noise. Microphone array 118 detects the soundfield to produce a set of microphone signals (also referred to as "sound signals"). Endpoint 104 converts the set of microphone signals representative of the detected soundfield into a set of sub-soundfields. Endpoint 104 processes each sub-soundfield separately/individually to suppress reverberation, suppress echo, and reduce noise therein, to produce a set of processed sub-soundfields each corresponding to a respective one of the sub-soundfields. Endpoint 104 audio mixes the set of processed sub-soundfields into a mixed audio signal, which may be encoded and transmitted over a network.

Figure 2:
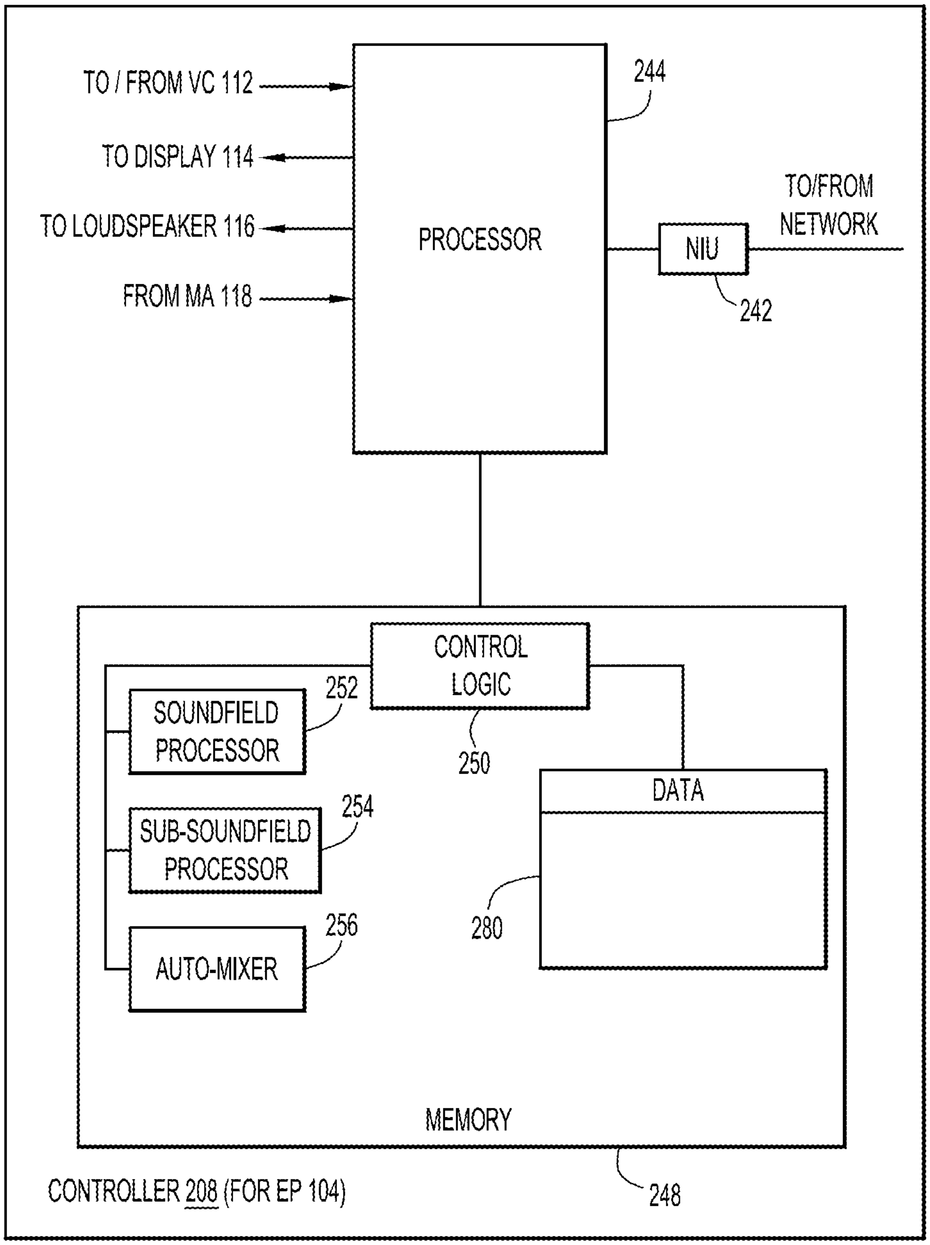
FIG. 2 is block diagram of a controller of the video conference endpoint, according to an example embodiment.

Reference is now made to FIG. 2, which is a block diagram of an example controller 208 of video conference endpoint 104 configured to perform embodiments presented herein. There are numerous possible configurations for controller 208 and FIG. 2 is meant to be an example. Controller 208 includes a network interface unit 242, a processor 244, and memory 248. The aforementioned components of controller 208 may be implemented in hardware, software, firmware, and/or a combination thereof. The network interface (I/F) unit (NIU) 242 is, for example, an Ethernet card or other interface device that allows the controller 208 to communicate over a communication network. Network I/F unit 242 may include wired and/or wireless connection capability.

Processor 244 may include a collection of microcontrollers and/or microprocessors, for example, each configured to execute respective software instructions stored in the memory 248. The collection of microcontrollers may include, for example: a video controller to receive, send, and process video signals related to display 114 and video camera 112; an audio processor to receive, send, and process audio signals related to loudspeaker 116 and MA 118; and a high-level controller to provide overall control. Portions of memory 248 (and the instruction therein) may be integrated with processor 244. In the transmit direction, processor 244 processes audio/video captured by MA 118/VC 112, encodes the captured audio/video into data packets, and causes the encoded data packets to be transmitted to communication network 110. In a receive direction, processor 244 decodes audio/video from data packets received from communication network 110 and causes the audio/video to be presented to local participant 106 via loudspeaker 116/display 114. As used herein, the terms "audio" and "sound" are synonymous and used interchangeably.

The memory 248 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 248 may comprise one or more computer readable storage media (e.g., a memory device) encoded with software comprising computer executable instructions and when the software is executed (by the processor 244) it is operable to perform the operations described herein. For example, the memory 248 stores or is encoded with instructions for control logic 250 perform operations described herein.

Control logic 250 may include a soundfield processor 252 to convert a detected soundfield into sub-soundfields, a sub-soundfield processor 254 to process each of the sub-soundfields separately to produce processed sub-soundfields, and an audio mixer 256 to audio mix/combine the processed sub-soundfields into a mixed audio output. In an embodiment, audio mixer 256 (also referred to simply as "mixer" 256) is an auto-mixer, but the mixer need not be an auto-mixer in other embodiments. In addition, memory 248 stores data 280 used and generated by modules 250-256.

Figure 3:
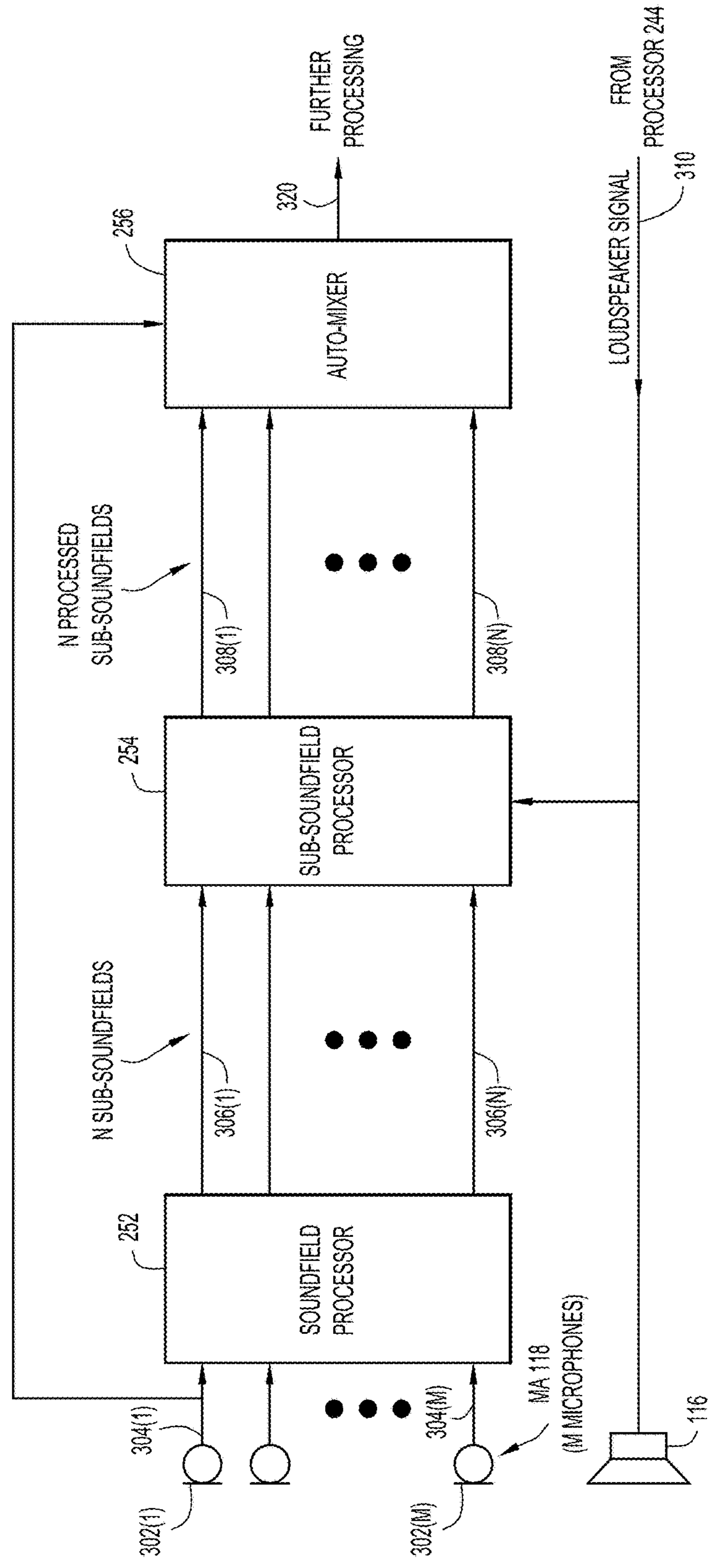
FIG. 3 is a signal processing flow diagram for a sound field processor, a sub-soundfield processor, and an audio mixer implemented in the controller, according to an example embodiment.

With reference to FIG. 3, there is depicted a signal processing flow diagram for sound field processor 252, sub-soundfield processor 254, and mixer 256.

Microphones 302(1)-302(M) of microphone array 118 concurrently detect a soundfield in room 105, to produce a parallel (i.e., concurrent) set of microphone signals 304(1)-304(M) (i.e., sound signals 304(1)-304(M)) each from a corresponding one of the microphones in the microphone array. The set of microphone signals 304(1)-304(M) represent the detected soundfield. The detected soundfield represents sound, with all of its acoustical characteristics, propagating in room 105 and impinging on microphone array 118.

Soundfield processor 252 decomposes or transforms the set of microphone signals 304(1)-304(M) representative of the detected soundfield into a parallel set of sub-soundfield signals 306(1)-306(N), where N may be equal to or different from M. The terms "sub-soundfield" and "sub-soundfield signal" are synonymous and used interchangeably. In a frequency domain embodiment of soundfield decomposition, soundfield processor 252 transforms each microphone signals 304(1)-304(M) from the time domain into the frequency domain using a Fourier transform. Thus, given M microphone signals, soundfield processor 252 computes M Fourier transforms, each having F frequency bins. In the frequency domain, for a given frequency f (i.e., frequency bin) and time frame k, a vector X(f,k) represents the entire detected soundfield at the given frequency f, where X(f,k):

$$X(f,k)=\{x1(f,k),x2(f,k), \ldots ,xM(f,k)\}.$$

The vector X(f,k) is of size 1×M because each element xi of the vector X(f,k) is a frequency domain representation of the microphone signal of frequency f (in frequency bin f). In other words, element x1 is the amplitude in frequency bin f from the Fourier transform of microphone signal 304(1), element x2 is the amplitude in frequency bin f from the Fourier transform of microphone signal 304(2), . . . , element xM is the amplitude in frequency bin f from the Fourier transform of microphone signal 304(M).

Given the vector X(f,k), a sub-soundfield signal vector Y(f,k) (of size 1×N), where Y(f,k)={y1(f,k), y2(f,k), . . . yN(f,k)}, may be calculated using a matrix transformation as follows:

$$Y(f,k)=X(f,k)H(f),$$

where $$H(f)=\begin{bmatrix} h_{11}(f) & \ldots & h_{N1}(f) \\ \vdots & \ddots & \vdots \\ h_{1M}(f) & \ldots & h_{NM}(f) \end{bmatrix}$$

H(f) is referred to as a frequency domain soundfield decomposition matrix of size M×N.

In a time domain embodiment of soundfield decomposition, soundfield processor 252 may decompose the detected soundfield into a set of N sub-soundfields signals in the time domain using a time domain decomposition matrix H(t) having elements $h_{ij}(t)$ (i=1-N, j=1-M) that are time domain filters, which operate directly on microphone signals 304(1)-304(M). That is, the time domain decomposition matrix is a matrix of time domain filters.

In a beamforming embodiment of soundfield decomposition, a microphone array beamforming technique may be used to generate several audio beams from microphone signals 304(1)-304(M), and to point the audio beams at different angles or toward different spatial sections in order to divide the detected soundfield into sub-soundfields or a so-called "beamspace."

Sub-soundfield processor 254 processes each sub-soundfield signal 306(1)-306(N) separately/individually and in parallel with the other sub-soundfield signals to suppress echo, suppress reverberation (i.e., dereverberate), and reduce noise in the sub-soundfield signal, to produce a parallel set of processed sub-soundfield signals 308(1)-308(N) corresponding to sub-soundfield signals 306(1)-306(N), respectively. For example, sub-soundfield processor 354 applies acoustic echo control, dereverberation, and noise reduction processing to sub-soundfield signal vector Y, to obtain processed subs-soundfield signal vector $Y=\{\bar{y}1, \ldots, \bar{y}N\}$. Sub-soundfield processor 254 also receives a loudspeaker signal 310 generated by controller 208 and destined for loudspeaker 116. Loudspeaker 116 transduces loudspeaker signal 310 into sound and transmits the sound into room 105, where the transmitted sound may contribute to the soundfield detected at microphone array 118. Sub-soundfield processor 254 uses loudspeaker signal 310, which is representative of the transmitted sound, to separately cancel acoustic echo from each sub-soundfield signal 306(*i*).

Mixer 256 mixes or combines the set of processed sub-soundfield signals 308(1)-308(N) into a mixed/combined audio signal 320 that is substantially free of undesired echo, reverberation, and other noise artifacts as a result of the sub-soundfield processing performed by sub-soundfield processor 254. Mixer 256 may receive one of microphone signals 304(1)-304(M), e.g., microphone signal 304(1), and use the received microphone signal in the mix process.

Figure 4:
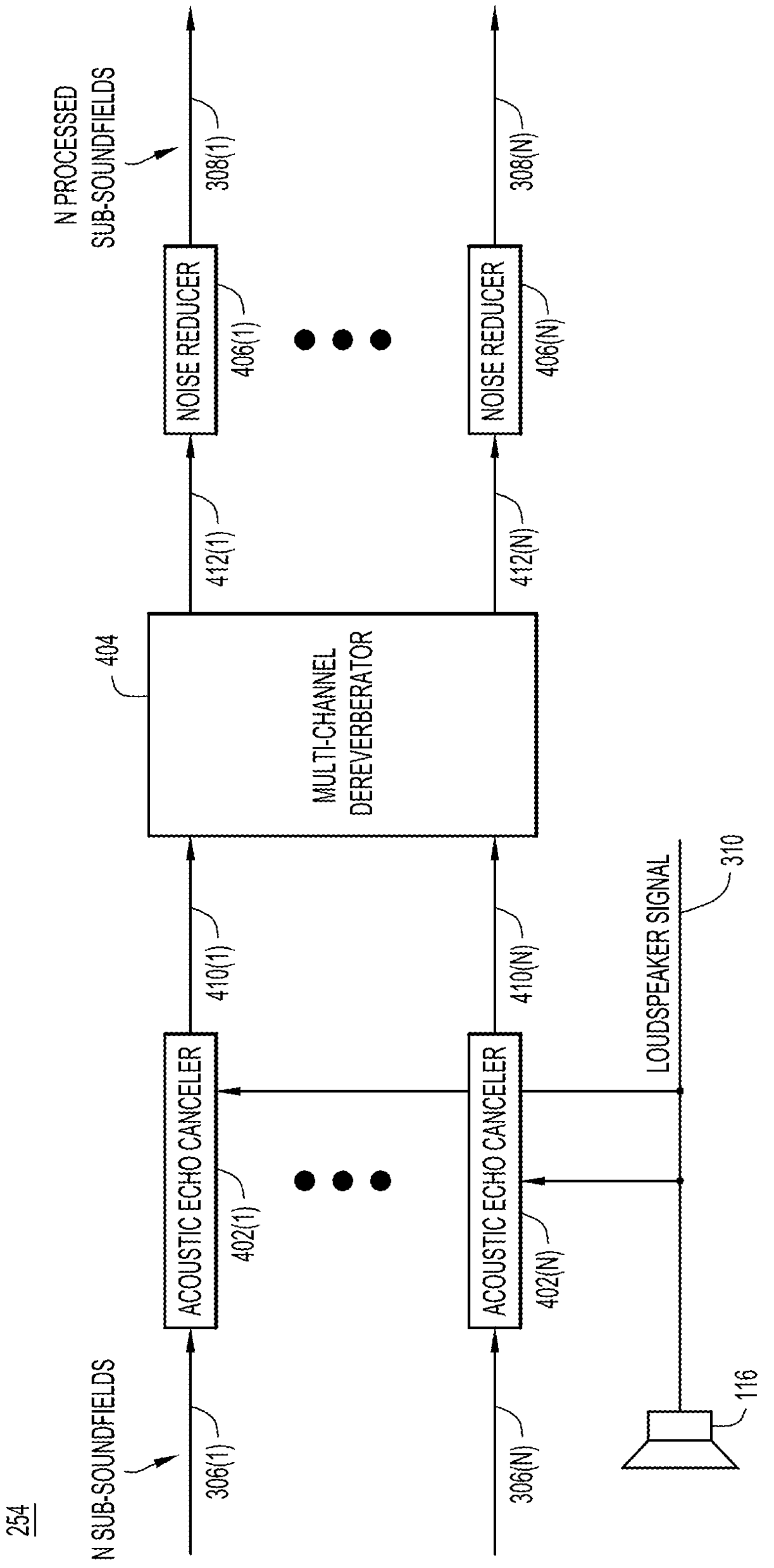
FIG. 4 is a block diagram of the sub-soundfield processor, according to an example embodiment.

With reference to FIG. 4, there is a block diagram of sub-soundfield processor 254. Sub-sound processor 254 includes a set of acoustic echo cancelers 402(1)-402(N), a multi-channel dereverberator 404, and a set of noise reducers 406(1)-406(N).

Acoustic echo cancelers 402(1)-402(N) operate in parallel to separately cancel acoustic echo from respective ones of sub-soundfield signals 306(1)-306(N) based on loudspeaker signal 310, to produce parallel echo-canceled sub-soundfield signals 410(1)-410(N), respectively.

Multi-channel dereverberator 404 separately cancels/suppresses reverberation in each of echo-canceled sub-soundfield signals 410(1)-410(N) to produce echo-canceled, dereverberated sub-soundfield signals 412(1)-412(N), each corresponding to a respective one of sub-soundfield signals 306(1)-306(N). Thus, in the example of FIG. 4, multi-channel dereverberator 404 is said to dereverberate sub-soundfield signals 306(1)-306(N) indirectly, i.e., based on signals derived from the sub-soundfield signals (e.g., via/based on signals 410(1)-410(N)).

Noise reducers 406(1)-406(N) operate in parallel to separately suppress residual echo and other noise artifacts in echo-canceled, dereverberated sub-soundfield signals 412(1)-412(N), respectively, to produce processed sub-soundfield signals 308(1)-308(N) as echo-canceled, dereverberated, and noise reduced processed sub-soundfield signals. Thus, in the example of FIG. 4, noise reducers 406(1)-406(N) are said to suppress residual echo and other noise artifacts in sub-soundfield signals 306(1)-306(N) indirectly, i.e., based on signals derived from the sub-soundfield signals (e.g., via/based on signals 412(1)-412(N)).

The order of cancelers 402(1)-402(N), multi-channel dereverberator 404, and noise reducers 406(1)-406(N) depicted in FIG. 4 is an example, only. The order may be permuted, for example, multi-channel dereverberator 404 may precede the echo cancelers, in which case the multi-channel dereverberator is said to dereverberate sub-soundfield signals 306(1)-306(N) directly. In another example, multi-channel dereverberator 404 may follow both the echo cancelers and the noise reducers.

Figure 5:
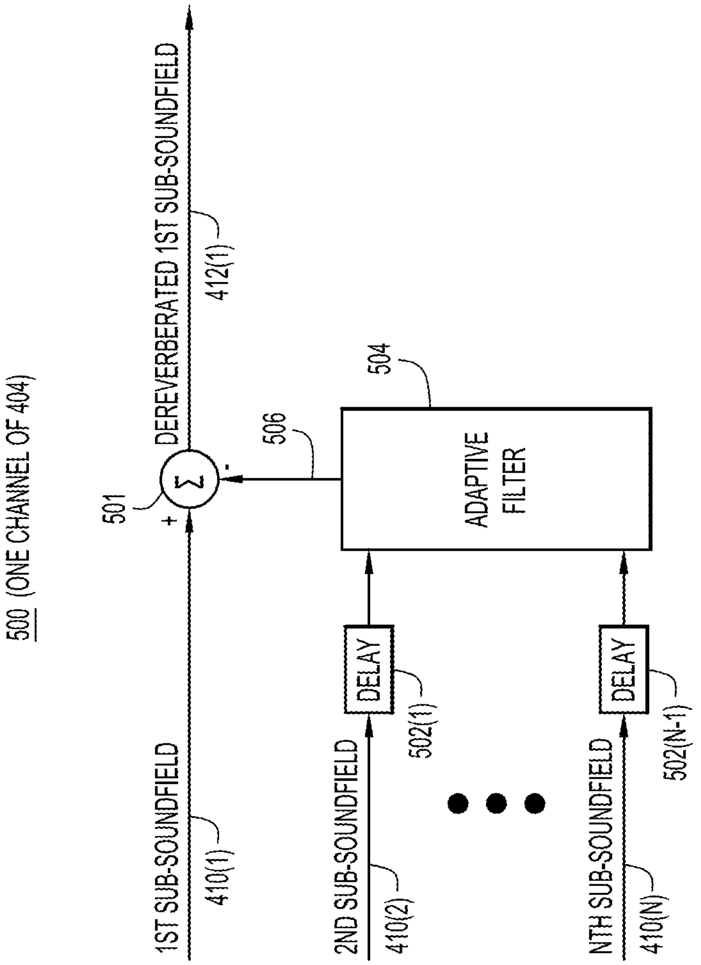
FIG. 5 is a block diagram of an individual dereverberator channel of a multi-channel dereverberator of the sub-soundfield processor, according to an example embodiment.

With reference to FIG. 5, there is a block diagram of an individual dereverberator channel 500 of multi-channel dereverberator 404. Multi-channel dereverberator 404 includes multiple individual dereverberators each configured similarly to dereverberator channel 500, and each to suppress reverberation in a respective one of echo-canceled sub-soundfield signals 410(1)-410(N) separately from the other echo-canceled sub-soundfield signals. Accordingly, the ensuing description of individual dereverberator channel 500 shall suffice for the other dereverberator channels of multi-channel dereverberator 404.

Dereverberator channel 500 dereverberates sub-soundfield signal 306(1) indirectly via echo-canceled sub-soundfield signal 410(1). That is, dereverberator channel 500 operates on echo-canceled sub-soundfield signal 410(1) to suppress reverberation in sub-soundfield signal 306(1). In dereverberator channel 500, echo-canceled sub-soundfield signal 410(1) represents a main capture channel, i.e., the signal from which reverberation is to be removed. Dereverberator channel 500 includes a summing node 501 to receive at a first input thereof echo-canceled sub-soundfield signal 410(1) from which reverberation is to be removed, and time delay units 502(1)-502(N−1) to receive echo-canceled sub-soundfield signals 410(2)-410(N) (i.e., all of the echo-canceled sub-soundfield signals, except for the echo-canceled sub-soundfield signal from which the reverberation is to be canceled). Time delay units 502(1)-502(N−1) introduce predetermined time delays (i.e., "delays") into echo-canceled sub-soundfield signals 410(2)-410(N), respectively, relative to main capture channel 410(1). Time delay values used by time delays 502(1)-502(N−1) may all be equal or may differ. The time delay values represent typical sound reverberation times expected in room 105. The larger the room, the larger the values. Example time delay values may range from 20-30 ms, although other values may be used depending on a size of room 105.

Time delay units 502(1)-502(N−1) output time-delayed versions of echo-canceled sub-soundfield signals 410(2)-410(N), respectively, to a reverberation estimator 504. Reverberation estimator 504 estimates reverberation in main capture channel 410(1) based on the time delayed versions of echo-canceled sub-soundfield signals 410(2)-410(N), and outputs a reverberation estimate 506 to a second input of summing node 501. In an example, reverberation estimator 504 includes an adaptive filter to adaptively filter the delayed versions mentioned above, to produce reverberation estimate 506. The adaptive filter may use any known or hereafter developed adaptive filtering technique, including, for example, normalized least mean squares (NLMS), recursive least squares (RLS), and an affline projection algorithm (APA).

Summing node 501 subtracts reverberation estimate 506 only from main capture channel 410(1), to produce echo-canceled, dereverberated signal 412(1).

Thus, generally, for each sub-soundfield signal 302(*i*) to be dereverberated, multi-channel dereverberator 404 delays all of sub-soundfield signals 302(1)-302(N), except for the sub-soundfield signal 302(*i*), estimates reverberation in the sub-soundfield signal 302(*i*) based on the delayed sub-soundfield signals, and subtracts the estimated reverberation from sub-soundfield signal 302(*i*), to produce the corresponding dereverberated sub-soundfield signal.

Figure 6:
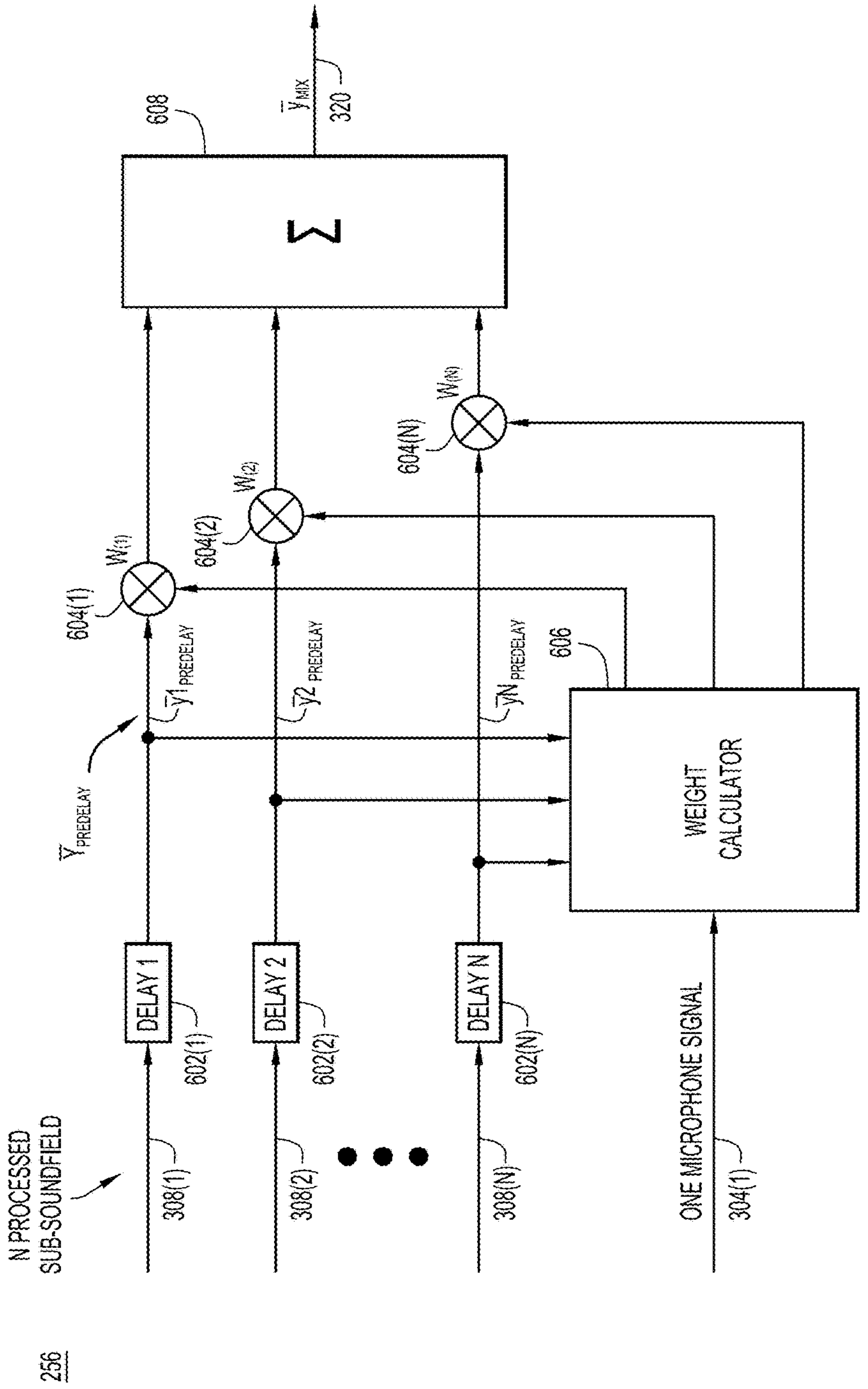
FIG. 6 is a block diagram of the audio mixer, according to an example embodiment.

With reference to FIG. 6, there is a block diagram of Mixer 256, according to an embodiment. Mixer 256 includes time-delay units 602(1)-602(N), multipliers 604(1)-604(N), a weight calculator 606, and a signal summer/combiner 608.

Time-delay units 602(1)-602(N) introduce predetermined delays into respective ones of processed sub-soundfield signals 308(1)-308(N), to produce delayed versions $\bar{y}1_{predelay}$-$\bar{y}N_{predelay}$ of the processed sub-soundfield signals, respectively, referred to in vector form as $\bar{Y}_{predelay}=\{\bar{y}1_{predelay}, \ldots, \bar{y}N_{predelay}\}$. Time delay units 602(1)-602(N) provide the delayed versions to respective ones of multipliers 604(1)-604(N) and to weight calculator 606. The predetermined delays introduced by time-delay units 602(1)-602(N) are equal to and thus compensate for group delays introduced into sub-soundfield signals 306(1)-306(2), respectively, by microphone array 118 and sub-soundfield processor 254. Hence, the predetermined delays may be referred to as "pre-delays." The pre-delays time-align processed sub-soundfield signals 308(1)-308(N) at the output of time-delay units 602(1)-602(N), to produce time aligned pre-delayed signals. The group delays (and thus pre-delays) may be determined, e.g., measured and/or calculated, based on the known spatial arrangement of microphones 302 in microphone 118, and the known elements of transformation matrix H.

Weight calculator 606 receives one of microphone signals 304(1)-304(N), e.g., 304(1), and computes signal weights w(1)-w(N) based on the delayed versions of the processed sub-soundfield signals $\bar{Y}_{predelay}=\{\bar{y}1_{predelay}, \ldots, \bar{y}N_{predelay}\}$ and the one of the microphone signals. Weight calculator 606 provides signal weights w(1)-w(N) to respective ones of multipliers 604(1)-604(N). In vector form, the weights are referred to as W={w(1), . . . , w(N)}.

Multipliers 604(1)-604(N) weight the delayed versions $\bar{Y}_{predelay}$ of processed sub-soundfield signals 306(1)-306(N) with respective ones of signal weights w(1)-w(N), to produce respective weighted signals. Multipliers 604(1)-604(N) provide their respective weighted signals to combiner 608.

Combiner 608 combines all of the weighted signals into a combined or mixed audio signal $\bar{y}_{mix}$, which may be a mono audio signal.

The pre-delaying, weighting, and combining operations performed by Mixer 256 are collectively represented in the following equation:

$$\bar{y}_{mix}=\bar{Y}_{predelay}W^T, \text{ where } T \text{ represents a transpose operation.}$$

Figure 7:
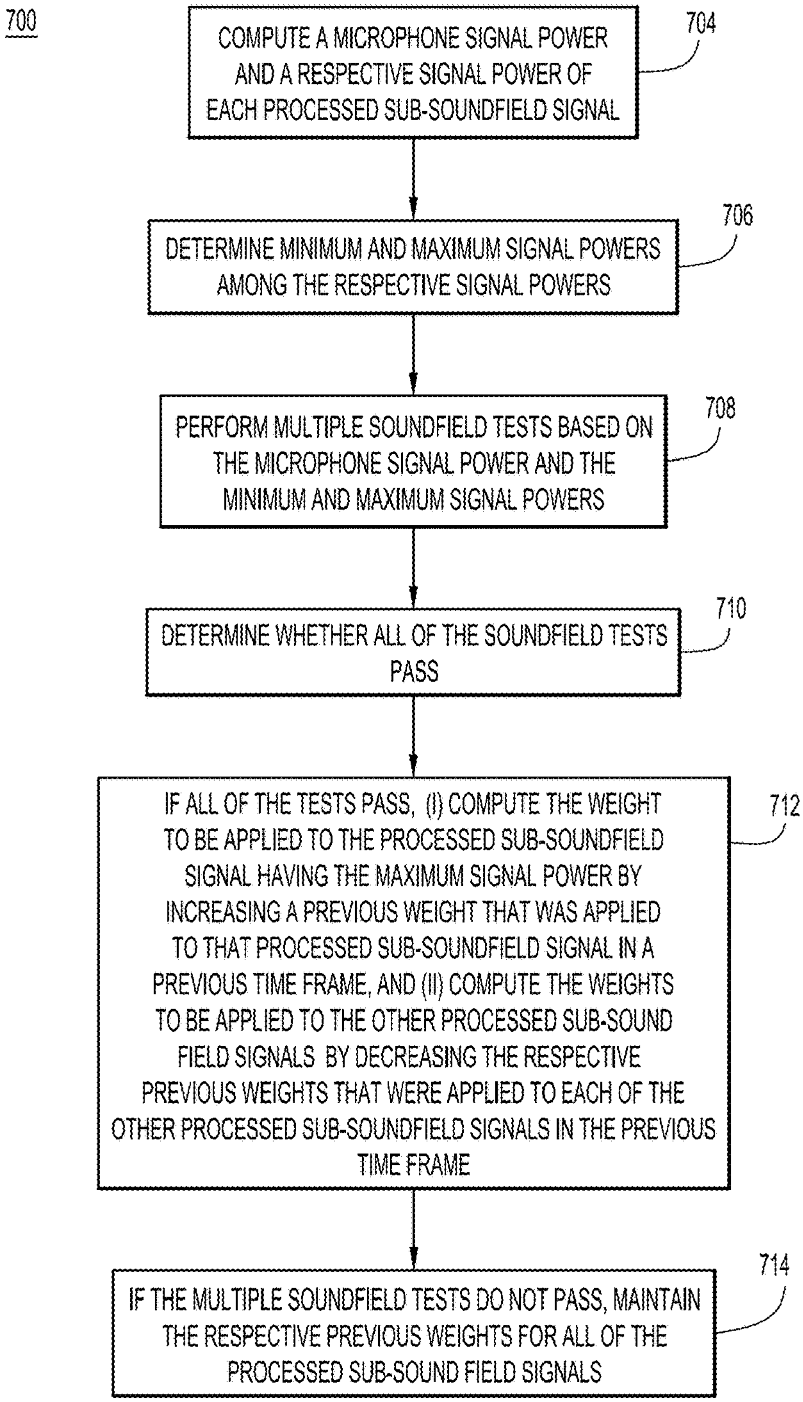
FIG. 7 is a flowchart of a method of determining signal weights performed by a weight calculator of the audio mixer, according to an example embodiment.

With reference to FIG. 7, there is a flowchart of an example method 700 of determining weights w(1)-w(N) performed by weight calculator 604. It is assumed that microphone signals 302(1)-302(N) span a sequence of time frames and that method 700 is performed repeatedly over time, i.e., once per each current time frame. In an example, each time frame (or simply "frame") is equal to 10 ms and is sampled at a sample rate of 48 KHz, to give a frame size of 480 audio samples. It is also assumed that statistics, including weights, generated for each current time frame in each iteration of method 700, are stored and thus accessible during subsequent frames. Weights w(1)-w(N) are each initialized to 1/N in an example.

At 704, weight calculator 604 computes (i) microphone signal power power_mic1 of the one of the microphone signals (e.g., microphone signal 304(1)) received at the weight calculator, and (ii) a respective signal power power_subsfi (where i=1-N) of each processed sub-soundfield signal 306(*i*). Weight calculator 604 may compute each signal power based on either the corresponding processed sub-soundfield signal or its pre-delayed version because their signal powers are the same.

At 706, weight calculator 604 determines a minimum signal power channel_subsf_min and a maximum signal power channel_subsf_max among the respective signal powers of processed sub-soundfield signals 306(1)-306(N). For the previous frame, the maximum signal power channel_subsf_max last has already been determined and stored.

At 708, weight calculator 604 performs multiple soundfield/sub-soundfield tests (also referred to simply as "soundfield tests" or just "tests") based on the microphone signal power and the minimum and maximum signal powers. The multiple soundfield tests may include the following tests:

a. a first test that tests whether a ratio of the maximum signal power channel_subsf_max to the minimum signal power channel_subsf_max exceeds a threshold ratio RATIO1 above which a presence of speech is indicated, and equal to or below which the presence of speech is not indicated;
b. a second test that tests whether a ratio of the maximum signal power channel_subsf_max to the microphone signal power power_mic1 exceeds a sound quality threshold ratio RATIO2 above which a relatively low-level of reverberant sound is indicated, and equal to or below which a relatively high-level of reverberant sound is indicated; and
c. a third test that tests whether a ratio of (i) a difference between the maximum signal power channel_subsf_max for the current frame and the maximum signal power channel_subsf_max last for the previous frame, and (ii) the frame size (e.g., 480 audio samples), exceeds a speech onset threshold ratio RATIO3 above which an onset of speech in the current frame relative to the previous frame is indicated, and equal to or below which the onset of speech is not indicated.

At 710, weight calculator 604 determines whether all of the multiple soundfield/sub-soundfield tests pass (i.e., evaluate to true).

At 712, if all of the multiple soundfield/sub-soundfield tests do not pass, weight calculator 604 maintains weights w(1)-w(N) from the previous frame. That is, for the current frame, weight calculator 604 outputs the same weights used in the previous frame.

At 714, if all of the multiple soundfield/sub-soundfield tests pass, weight calculator 604:

a. computes the weight to be applied to the pre-delayed processed sub-soundfield signal having the maximum signal power (determined at operation 704) by increasing the previous weight that was applied to that pre-delayed processed sub-soundfield signal in the previous frame; and
b. computes the weights to be applied to all of the other pre-delayed processed sub-sound field signals that do not have the maximum signal power by decreasing the respective previous weights that were applied to each of the other pre-delayed processed sub-soundfield signals in the previous frame.

In an example of operation 714, weight calculator 604 computes/assigns the weights as follows:

a. w(channel_subsf_max)←w(channel_subsf_max)+0.3; and b. w(channel_all_others)←w(channel_subsf_max)−0.1, where the weights are each constrained to be in a range of 0-1, "w(channel_subsf_max)" represents the weight applied to the pre-delayed processed sub-soundfield signal having the maximum signal power, and "w(channel_all_others)" represents the weights for all of the other pre-delayed processed sub-soundfield signals.

Embodiments presented herein simplify an audio configuration used for audio/visual conferencing and reduce microphone clutter by eliminating the conventional collection of microphones used for video/audio conferencing. The embodiments also mitigate comb-filtering effects usually present in audio mixing. The embodiments process sub-soundfield signals separately from each other in corresponding ones of sub-soundfield signal processing channels, that each include per channel/individualized echo-canceling, dereverberating, noise reducing, pre-delaying, and weighting, leading to combining of the channels in a last audio mixing operation, which may be an auto-mixing operation. Such individualized sub-soundfield signal processing advantageously leads to improved dereverberation in the audio mixed audio signal.

In summary, in one form, a method is provided comprising: at a microphone array, detecting a soundfield to produce a set of microphone signals each from a corresponding microphone of the microphone array, the set of microphone signals representative of the soundfield; decomposing the detected soundfield into a set of sub-soundfield signals based on the set of microphone signals; processing each sub-soundfield signal, including dereverberating each sub-soundfield signal using other ones of the sub-soundfield signals to remove reverberation from the sub-soundfield signal, to produce a set of processed sub-soundfield signals; and mixing the set of processed sub-sound field signals into a mixed audio output signal.

In summary, in another form, an apparatus is provided comprising: a microphone array configured to detect a soundfield to produce a set of microphone signals each from a corresponding microphone in the microphone array, the set of microphone signals representative of the soundfield; and a processor coupled to the microphones and configured to: decompose the detected soundfield into a set of sub-soundfield signals based on the set of microphone signals; process each sub-soundfield signal, including dereverberating each sub-soundfield signal using other ones of the sub-soundfield signals to remove reverberation from the sub-soundfield signal, to produce a set of processed sub-soundfield signals; and mix the set of processed sub-sound field signals into a mixed output signal.

In summary, in yet another form, a non-transitory processor readable medium is provided to store instructions that, when executed by a processor, cause the processor to perform the methods described above. Stated otherwise, a non-transitory computer-readable storage media encoded with software comprising computer executable instructions and when the software is executed operable to: receive from a microphone array configured to detect a soundfield a set of microphone signals each from a corresponding microphone of the microphone array, the set of soundfield signals representative of the detected soundfield; decompose the detected soundfield into a set of sub-soundfield signals based on the set of microphone signals; process each sub-soundfield signal, including dereverberating each sub-soundfield signal using other ones of the sub-soundfield signals to remove reverberation from the sub-soundfield signal, to produce a set of processed sub-soundfield signals; and mix the set of processed sub-sound field signals into a mixed output signal.

The above description is intended by way of example only. Various modifications and structural changes may be made therein without departing from the scope of the concepts described herein and within the scope and range of equivalents of the claims.

What is claimed is:

1. A method comprising:

at a microphone array, detecting a soundfield to produce a set of microphone signals each from a corresponding microphone in the microphone array, the set of microphone signals representative of the soundfield;

decomposing the detected soundfield into a set of sub-soundfield signals based on the set of microphone signals;

processing each sub-soundfield signal, including dereverberating each sub-soundfield signal using other ones of the sub-soundfield signals to remove reverberation from the sub-soundfield signal, to produce a set of processed sub-soundfield signals; and mixing the set of processed sub-sound field signals into a mixed output signal.

2. The method of claim 1, wherein the decomposing includes decomposing the detected soundfield using a soundfield decomposition matrix.

3. The method of claim 2, wherein the decomposing includes decomposing the detected soundfield in a time domain using a time domain soundfield decomposition matrix.

4. The method of claim 2, wherein the decomposing includes decomposing the detected soundfield in a frequency domain using a frequency domain soundfield decomposition matrix.

5. The method of claim 1, wherein the decomposing includes decomposing using a beam forming technique.

6. The method of claim 1, wherein the dereverberating each sub-soundfield signal includes:

estimating reverberation in the sub-soundfield signal to be dereverberated based on delayed versions of the other ones of the sub-sound field signals but not the sub-soundfield signal to be dereverberated; and subtracting the estimated reverberation from the sub-soundfield signal to be dereverberated to produce a dereverberated sub-soundfield signal.

7. The method of claim 6, wherein the estimating includes adaptively filtering the delayed versions of the other ones of the sub-soundfield signals to produce the estimated reverberation.

8. The method of claim 1, further comprising:

at a loudspeaker, converting a loudspeaker signal to sound and transmitting the sound into the soundfield, wherein the processing each sub-sound field signal further includes canceling acoustic echo in each sub-soundfield signal based on the loudspeaker signal to produce each processed sub-soundfield signal as an echo-canceled dereverberated sub-soundfield signal.

9. The method of claim 8, wherein the processing each sub-sound field signal further includes:

reducing noise in each sub-soundfield signal to produce each processed sub-soundfield signal as a noise reduced, echo-canceled, dereverberated sub-soundfield signal.

10. The method of claim 1, wherein the mixing further includes:

pre-delaying each processed sub-soundfield signal by a respective group delay to produce pre-delayed sub-soundfield signals;

determining weights for respective ones of the processed sub-soundfield signals based on the pre-delayed sub-soundfield signals and one of the microphone signals, and applying the weights to respective ones of the pre-delayed processed sub-soundfield signals to produce weighted pre-delayed processed sub-soundfield signals; and combining the weighted pre-delayed processed sub-soundfield signals into the mixed output signal.

11. The method of claim 10, wherein the microphone signals span a sequence of time frames and the determining the weights includes determining the weights for each current time frame by:

computing a microphone signal power of the one of the microphone signals and a respective signal power of each processed sub-soundfield signal;

determining minimum and maximum signal powers among the respective signal powers;

performing multiple soundfield tests based on the microphone signal power and the minimum and maximum signal powers; and computing the weights to be applied to the pre-delayed sub-soundfield signals based on whether all of the multiple soundfield tests pass.

12. The method of claim 11, wherein the determining the weights further comprises:

if all of the multiple soundfield tests pass:

computing the weight to be applied to the pre-delayed processed sub-soundfield signal having the maximum signal power by increasing a previous weight that was applied to that pre-delayed processed sub-soundfield signal in a previous time frame; and computing the weights to be applied to the other pre-delayed processed sub-sound filed signals that do not have the maximum signal power by decreasing the respective previous weights that were applied to each of the other pre-delayed processed sub-soundfield signals in the previous time frame; and if all of the multiple soundfield tests do not pass, maintaining the respective weights for all of the pre-delayed processed sub-sound field signals.

13. The method of claim 11, wherein the performing multiple soundfield tests includes:

first testing whether a ratio of the maximum signal power to the minimum signal power exceeds a threshold above which a presence of speech is indicated, and equal to or below which the presence of speech is not indicated;

second testing whether a ratio of the maximum signal power to the microphone signal power exceeds a sound quality threshold above which a relatively low-level of reverberant sound is indicated, and equal to or below which a relatively high-level of reverberant sound is indicated; and third testing whether a difference between the maximum signal power for the current time frame and a maximum signal power for the previous time frame exceeds a speech onset threshold above which the onset of speech in the current time frame relative to the previous time frame is indicated, and equal to or below which the onset of speech is not indicated.

14. An apparatus comprising:

a microphone array configured to detect a soundfield to produce a set of microphone signals each from a corresponding microphone in the microphone array, the set of microphone signals representative of the soundfield; and a processor coupled to the microphones and configured to:

decompose the detected soundfield into a set of sub-soundfield signals based on the set of microphone signals;

process each sub-soundfield signal, including dereverberating each sub-soundfield signal using other ones of the sub-soundfield signals to remove reverberation from the sub-soundfield signal, to produce a set of processed sub-soundfield signals; and mix the set of processed sub-sound field signals into a mixed output signal.

15. The apparatus of claim 14, wherein the processor is configured to dereverberate each sub-soundfield signal by:

estimating reverberation in the sub-soundfield signal to be dereverberated based on delayed versions of the other ones of the sub-sound field signals but not the sub-soundfield signal to be dereverberated; and subtracting the estimated reverberation from the sub-soundfield signal to be dereverberated to produce a dereverberated sub-soundfield signal.

16. The apparatus of claim 15, wherein the processor is configured to perform the estimating by adaptively filtering the delayed versions of the other ones of the sub-soundfield signals to produce the estimated reverberation.

17. The apparatus of claim 14, further comprising:

at a loudspeaker, converting a loudspeaker signal to sound and transmitting the sound into the soundfield, wherein the processor is further configured to process each sub-sound field signal by canceling acoustic echo in each sub-soundfield signal based on the loudspeaker signal to produce each processed sub-soundfield signal as an echo-canceled dereverberated sub-soundfield signal.

18. A non-transitory computer-readable storage media encoded with software comprising computer executable instructions and when the software is executed operable to:

receive from a microphone array configured to detect a soundfield a set of microphone signals each from a corresponding microphone in the microphone array, the set of soundfield signals representative of the detected soundfield;

decompose the detected soundfield into a set of sub-soundfield signals based on the set of microphone signals;

process each sub-soundfield signal, including dereverberating each sub-soundfield signal using other ones of the sub-soundfield signals to remove reverberation from the sub-soundfield signal, to produce a set of processed sub-soundfield signals; and mix the set of processed sub-sound field signals into a mixed output signal.

19. The computer-readable storage media of claim 18, wherein the instructions operable to dereverberate each sub-soundfield signal include instructions operable to:

estimate reverberation in the sub-soundfield signal to be dereverberated based on delayed versions of the other ones of the sub-sound field signals but not the sub-soundfield signal to be dereverberated; and subtract the estimated reverberation from the sub-soundfield signal to be dereverberated to produce a dereverberated sub-soundfield signal.

20. The computer-readable storage media of claim 19, wherein the instructions operable to estimate include instruction operable to adaptively filter the delayed sub-soundfield signals to produce the estimated reverberation.

* * * * *